United States Patent
Yu

(10) Patent No.: US 10,295,235 B2
(45) Date of Patent: May 21, 2019

(54) GAS COOLING EQUIPMENT AND HIGH TEMPERATURE OPERATING SYSTEM

(71) Applicant: Shenzhen China Star Optoelectronics Technology Co., Ltd., Guangdong (CN)

(72) Inventor: Wei Yu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 808 days.

(21) Appl. No.: 14/404,032

(22) PCT Filed: Aug. 1, 2014

(86) PCT No.: PCT/CN2014/083571
§ 371 (c)(1),
(2) Date: Aug. 25, 2015

(87) PCT Pub. No.: WO2016/004659
PCT Pub. Date: Jan. 14, 2016

(65) Prior Publication Data
US 2016/0010903 A1    Jan. 14, 2016

(30) Foreign Application Priority Data
Jul. 11, 2014 (CN) .......................... 2014 1 0330365

(51) Int. Cl.
*B01D 5/00* (2006.01)
*B01D 8/00* (2006.01)
(Continued)

(52) U.S. Cl.
CPC ............ *F25B 41/00* (2013.01); *B01D 5/0003* (2013.01); *B01D 5/0018* (2013.01); *B01D 8/00* (2013.01);
(Continued)

(58) Field of Classification Search
CPC ....... B01D 5/0018; B01D 5/0003; B01D 8/00
See application file for complete search history.

(56) References Cited

U.S. PATENT DOCUMENTS 3,888,784 A * 6/1975 Pighin .................... C09K 11/07
                                                          252/301.16
5,072,592 A * 12/1991 Ishigaki ................... B01D 8/00
                                                          62/55.5

FOREIGN PATENT DOCUMENTS

CN    200975826    11/2007
CN    202161911    3/2012
(Continued)

OTHER PUBLICATIONS

International Search Report and the Written Opinion dated Apr. 22, 2015 From the State Intellectual Property Office of the People's Republic of China Re. Application No. PCT/CN2014/083571 and Its Translation of Search Report in English.

*Primary Examiner* — Orlando E Aviles

(57) ABSTRACT

A gas cooling equipment is provided comprising a refrigerant storage device, a cooling processing device, and a dehydrating device. The dehydrating device is disposed on an air intake end of the cooling processing device for dewatering a high temperature gas. The invention is adopted to solve problems arising from the pressure increasing and the quartz cassettes breaking easily due to moisture in a low temperature portion of the high temperature gas discharged from a high temperature oven entering the cooling processing device, thereby improving manufacturing efficiency and reducing the manufacturing cost.

11 Claims, 2 Drawing Sheets

(51) Int. Cl.
*F25B 41/00* (2006.01)
*B01D 53/26* (2006.01)
(52) U.S. Cl.
CPC ...... *B01D 53/261* (2013.01); *B01D 2253/108* (2013.01)

(56) References Cited

FOREIGN PATENT DOCUMENTS

| | | |
|---|---|---|
| CN | 102751447 | 10/2012 |
| JP | 11-333253 | 12/1999 |
| WO | WO 2012/101359 | 8/2012 |

* cited by examiner

GAS COOLING EQUIPMENT AND HIGH TEMPERATURE OPERATING SYSTEM

RELATED APPLICATIONS

This application is a National Phase of PCT Patent Application No. PCT/CN2014/083571 having International filing date of Aug. 1, 2014, which claims the benefit of priority of Chinese Patent Application No. 201410330365.0 filed on Jul. 11, 2014. The contents of the above applications are all incorporated by reference as if fully set forth herein in their entirety.

FIELD OF THE INVENTION

The present invention relates to the field of packaging organic light emitting displays, and more particularly to a gas cooling equipment and a high temperature operating system.

BACKGROUND OF THE INVENTION

OLEDs (Organic Light Emitting Displays) are a new generation of displays. The process of manufacturing the OLEDs comprises forming an organic thin film on a substrate, where the organic thin film is located between a cathode metal and an anode metal for providing a voltage to these two electrodes, so that the organic thin film will emit light. The organic thin film is very sensitive to moisture and oxygen. In the presence of moisture and oxygen, the organic thin film will deteriorate, thereby decreasing the luminance and life of the displays. Therefore, the OLED devices must be packaged.

A method for packaging a package cover and an OLED substrate is by using UV (Ultraviolet Rays) curable resins, and another method, which achieves a better packaging effect, is by using glass frit. The glass frit's capability of isolating moisture and oxygen is better than the UV curable resins. The process of packaging by the glass frit is as follows: applying the glass frit on the package cover; baking the package cover in a high temperature oven at a high temperature between 500 degrees Celsius and 600 degrees Celsius; applying the UV curable resins on the package cover; adhering the package cover to an OLED substrate; curing the UV curable resins by exposing them to UV light, where the UV curable resins are applied for temporarily adhering two glasses and achieving a temporary packaging effect; finally, melting and refreezing the baked glass frit by laser. The package cover is adhered to the OLED substrate, and the packaging effect is achieved.

Due to the requirements of cleanliness and temperature in the high temperature oven, the glass covers are disposed and baked on different layers of quartz cassettes. In general, the high temperature gas in the high temperature oven is discharged after cooling. The high temperature gas comprises moisture, so that the moisture in a low temperature portion of the high temperature gas will freeze when cooling, thereby causing blockages within the pipelines, therefore the high temperature gas cannot be discharged in time, and the pressure is increased. Therefore, the process will stop or the glass covers will break due to the quartz cassettes vibrating.

SUMMARY OF THE INVENTION

An object of the present invention is to provide a gas cooling equipment for preventing problems arising from the pressure increasing and the quartz cassettes breaking easily due to moisture in a low temperature portion of the high temperature gas discharged from a high temperature oven entering the cooling processing device, thereby improving manufacturing efficiency and reducing the manufacturing cost.

In order to solve the above-mentioned technical problems, a gas cooling equipment comprises:

A refrigerant storage device comprises refrigerants having a temperature between −40 degrees Celsius and −30 degrees Celsius therein;

A cooling processing device is disposed in the refrigerant storage device for cooling a high temperature gas via the refrigerants, where the cooling processing device comprises an air intake end and an air outtake end, and A dehydrating device is disposed on the air intake end of the cooling processing device for dewatering the high temperature gas, where the dehydrating device is a molecular sieve dehydrating device for dewatering the high temperature gas having a range between 60 degrees Celsius and 80 degrees Celsius.

In the gas cooling equipment of the present invention, when a temperature of the high temperature gas is greater than the range between 60 degrees Celsius and 80 degrees Celsius, the molecular sieve dehydrating device discharges moisture.

In the gas cooling equipment of the present invention, the cooling processing device comprises an inlet pipe, an outlet pipe, and a closed container;

Where the closed container is disposed in the refrigerant storage device;

A terminal of the inlet pipe extends to an outside of the closed container, and another terminal of the inlet pipe extends to an inside of the closed container and is positioned near a bottom of the closed container;

A terminal of the outlet pipe extends to the inside of the closed container and is positioned near a top of the closed container, and another terminal of the outlet pipe extends to the outside of the closed container.

The present invention provides a gas cooling equipment comprises:

A refrigerant storage device comprises refrigerants having a preset temperature therein;

A cooling processing device is disposed in the refrigerant storage device for cooling a high temperature gas via the refrigerants, where the cooling processing device comprises an air intake end and an air outtake end, and A dehydrating device is disposed on the air intake end of the cooling processing device for dewatering the high temperature gas.

In the gas cooling equipment of the present invention, the dehydrating device is a molecular sieve dehydrating device for dewatering the high temperature gas in a predetermined temperature range.

In the gas cooling equipment of the present invention, when a temperature of the high temperature gas is greater than the predetermined temperature range, the molecular sieve dehydrating device discharges moisture.

In the gas cooling equipment of the present invention, the predetermined temperature range is between 60 degrees Celsius and 80 degrees Celsius, and the preset temperature is between −40 degrees Celsius and −30 degrees Celsius.

In the gas cooling equipment of the present invention, the cooling processing device comprises an inlet pipe, an outlet pipe, and a closed container;

Where the closed container is disposed in the refrigerant storage device;

A terminal of the inlet pipe extends to an outside of the closed container, and another terminal of the inlet pipe extends to an inside of the closed container and is positioned near a bottom of the closed container;

A terminal of the outlet pipe extends to the inside of the closed container and is positioned near a top of the closed container, and another terminal of the outlet pipe extends to the outside of the closed container.

In the gas cooling equipment of the present invention, the dehydrating device is a dry box.

Another object of the present invention is to provide a high temperature operating system comprises:

A high temperature processing equipment is used for treating an operate-needed item in a high temperature and producing a high temperature gas, where the high temperature gas is discharged via a high temperature gas output terminal;

A gas cooling equipment is connected with the high temperature gas output terminal of the high temperature processing equipment, comprises:

A refrigerant storage device comprises refrigerants having a preset temperature therein;

A cooling processing device is disposed in the refrigerant storage device for cooling the high temperature gas via the refrigerants, where the cooling processing device comprises an air intake end and an air outtake end, and A dehydrating device is disposed on the air intake end of the cooling processing device for dewatering the high temperature gas.

In the high temperature operating system of the present invention, the dehydrating device is a molecular sieve dehydrating device for dewatering the high temperature gas in a predetermined temperature range.

In the high temperature operating system of the present invention, when a temperature of the high temperature gas is greater than the predetermined temperature range, the molecular sieve dehydrating device discharges moisture.

In the high temperature operating system of the present invention, the dehydrating device is a dry box.

In the high temperature operating system of the present invention, the cooling processing device comprises an inlet pipe, an outlet pipe, and a closed container;

Where the closed container is disposed in the refrigerant storage device;

A terminal of the inlet pipe extends to an outside of the closed container, and another terminal of the inlet pipe extends to an inside of the closed container and is positioned near a bottom of the closed container;

A terminal of the outlet pipe extends to the inside of the closed container and is positioned near a top of the closed container, and another terminal of the outlet pipe extends to the outside of the closed container.

The gas cooling equipment and the high temperature operating system provided by the present invention can dewater the high temperature gas by adding the dehydrating device to the gas cooling equipment, so as to solve problems arising from the pressure increasing and the quartz cassettes breaking easily due to moisture in a low temperature portion of the high temperature gas discharged from a high temperature oven entering the cooling processing device, thereby improving manufacturing efficiency and reducing the manufacturing cost.

DETAILED DESCRIPTION OF THE INVENTION

Figure 1:
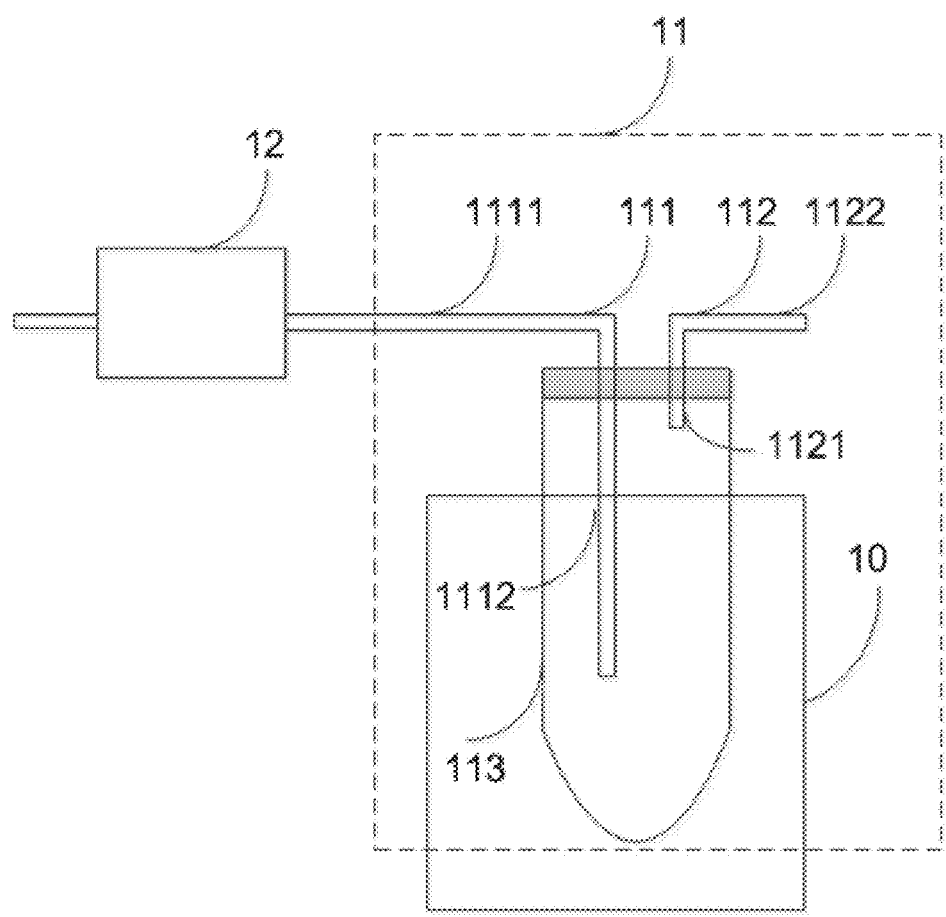
FIG. 1 shows a schematic diagram of the gas cooling equipment according to an embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Please refer to FIG. 1, which shows a schematic diagram of the gas cooling equipment according to an embodiment of the present invention.

As shown on FIG. 1, the gas cooling equipment comprises a refrigerant storage device 10, a cooling processing device 11, and a dehydrating device 12. The refrigerant storage device 10 comprises refrigerants having a preset temperature therein. The preset temperature may be, for example, between −40 degrees Celsius and −30 degrees Celsius.

The cooling processing device 11 comprises an air intake end and an air outtake end. A high temperature gas is introduced into the air intake end. The cooling processing device 11 is disposed in the refrigerant storage device 10 for cooling the high temperature gas via the refrigerants of the refrigerant storage device 10.

The cooling processing device 11 comprises an inlet pipe 111, an outlet pipe 112, and a closed container 113. The closed container 113 is disposed in the refrigerant storage device 10.

A terminal 1111 of the inlet pipe 111 extends to the outside of the closed container 113, and another terminal 1112 of the inlet pipe 111 extends to the inside of the closed container 113 and is positioned near the bottom of the closed container 113.

A terminal 1121 of the outlet pipe 112 extends to the inside of the closed container 113 and is positioned near the top of the closed container 113, and another terminal 1122 of the outlet pipe 112 extends to the outside of the closed container 113. The high temperature gas passes through the inlet pipe 111 into the closed container 113. Since the closed container 113 is disposed in the refrigerant storage device 10, the high temperature gas can be cooled when it enters the closed container 113. The another terminal 1112 of the inlet pipe 111 is positioned near the bottom of the closed container 113, and the terminal 1121 of the outlet pipe 112 is positioned near the top of the closed container 113, so that the flow time of the high temperature gas in the closed container 113 will increase, and the cooling time will increase correspondingly, thereby achieving a good cooling effect.

The closed container 113 may be, for example, a gas collecting bottle having a bottle plug, which includes two holes for providing the inlet pipe 111 and the outlet pipe 112 respectively extending into the gas collecting bottle via the holes. The diameters of the two holes of the bottle plug are slightly larger than the diameters of the inlet pipe 111 and the outlet pipe 112.

After cooling the high temperature gas, the high temperature gas is discharged via the outlet pipe 112. The outlet pipe 112 is connected with an outer waste gas purification apparatus.

The dehydrating device 12 is disposed on the air intake end of the cooling processing device 11 (as same as the terminal 1111 of the inlet pipe 111). Before cooling the high temperature gas by the cooling processing device 11, the high temperature gas in the cooling processing device 11 is dewatered by the dehydrating device 12.

The dehydrating device 12 may be a molecular sieve dehydrating device. When the temperature of the high temperature gas is in the range of the preset temperature, the molecular sieve dehydrating device is capable of absorbing moisture in the high temperature gas. When the temperature of the high temperature gas is greater than the range of the preset temperature, the molecular sieve dehydrating device is capable of gasifying and discharging the previously absorbed moisture due to the temperature of the high temperature gas. That is, the molecular sieve dehydrating device discharges moisture. Since the dehydrating device which can discharge the previously absorbed moisture is adopted, the dehydrating device does not require regular replacement. The preset temperature may be, for example, between 60 degrees Celsius and 80 degrees Celsius.

The dehydrating device 12 may be a dry box, which has desiccants therein. The dry box is used to absorb the moisture in the introduced high temperature gas. After the high temperature gas is dried, the high temperature gas is introduced into the cooling processing device 11. After the dry box absorbs a certain amount of moisture, the absorption capability is decreased. Therefore, in order to achieve a good dewatering effect, the dry box would require regular replacement.

The working process of the gas cooling equipment is as follows: firstly, introducing the high temperature gas into the gas cooling equipment; dewatering the high temperature gas via the dehydrating device 12; introducing the dewatered high temperature gas into the closed container 113 by passing it through the inlet pipe 111; cooling the dewatered high temperature gas via the refrigerants in the closed container 113 of the refrigerant storage device 10; finally, discharging the cooled high temperature gas by passing it through the outlet pipe 112.

The present invention provides the gas cooling equipment which can dewater the high temperature gas by adding the dehydrating device to the gas cooling equipment, so as to solve problems arising from the pressure increasing and the quartz cassettes are breaking easily due to moisture in the low temperature portion of the high temperature gas discharged from a high temperature oven entering the cooling processing device, thereby improving manufacturing efficiency and reducing the manufacturing cost.

Figure 2:
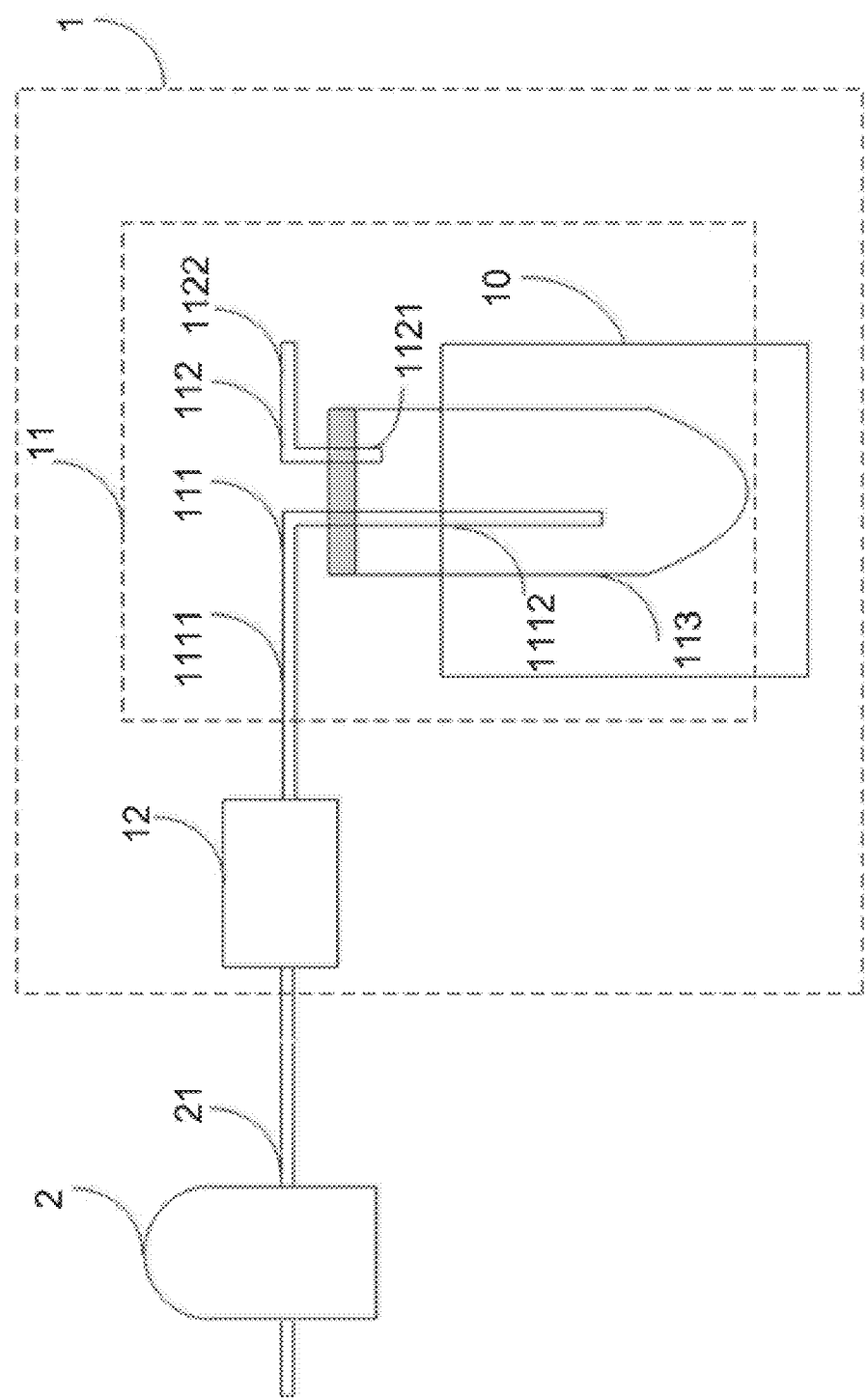
FIG. 2 shows a schematic diagram of the high temperature operating system according to an embodiment of the present invention.

Please refer to FIG. 2, which shows a schematic diagram of the high temperature operating system according to an embodiment of the present invention.

As shown on FIG. 2, the high temperature operating system comprises a high temperature processing equipment 2 and a gas cooling equipment 1. The gas cooling equipment 1 is connected with a high temperature gas output terminal 21 of the high temperature processing equipment 2.

The high temperature processing equipment 2 is used for treating an operate-needed item in a high temperature. The high temperature processing equipment 2 comprises a shielding gas. The high temperature processing equipment 2 can heat the shielding gas and produce a high temperature gas. The high temperature processing equipment 2 comprises the high temperature gas output terminal 21, and the high temperature gas is introduced into the gas cooling equipment 1 by passing it through the high temperature gas output terminal 21. The high temperature processing equipment 2 may be, for example, a high temperature oven, and the operate-needed item may be, for example, an OLED package cover.

The gas cooling equipment 1 comprises a refrigerant storage device 10, a cooling processing device 11, and a dehydrating device 12. The refrigerant storage device 10 comprises refrigerants having a preset temperature therein. The preset temperature may be, for example, between −40 degrees Celsius and −30 degrees Celsius.

The cooling processing device 11 comprises an air intake end and an air outtake end. The dewatered high temperature gas is introduced into the air intake end by passing it through the dehydrating device 12. The cooling processing device 11 is disposed in the refrigerant storage device 10 for cooling the high temperature gas via the refrigerants of the refrigerant storage device 10.

The cooling processing device 11 comprises an inlet pipe 111, an outlet pipe 112, and a closed container 113. The closed container 113 is disposed in the refrigerant storage device 10.

Preferably, a terminal 1111 of the inlet pipe 111 extends to the outside of the closed container 113, and another terminal 1112 of the inlet pipe 111 extends to the inside of the closed container 113 and is positioned near the bottom of the closed container 113.

A terminal 1121 of the outlet pipe 112 extends to the inside of the closed container 113 and is positioned near the top of the closed container 113, and another terminal 1122 of the outlet pipe 112 extends to the outside of the closed container 113. The high temperature gas passes through the inlet pipe 111 into the closed container 113. Since the closed container 113 is disposed in the refrigerant storage device 10, the high temperature gas can be cooled when it enters the closed container 113. The another terminal 1112 of the inlet pipe 111 is positioned near the bottom of the closed container 113, and the terminal 1121 of the outlet pipe 112 is positioned near the top of the closed container 113, so that the flow time of the high temperature gas in the closed container 113 will increase, and the cooling time will increase correspondingly, thereby achieving a good cooling effect.

The closed container 113 may be, for example, a gas collecting bottle having a bottle plug, which includes two holes for providing the inlet pipe 111 and the outlet pipe 112 respectively extending into the gas collecting bottle via the holes. The diameters of the two holes of the bottle plug are slightly larger than the diameters of the inlet pipe 111 and the outlet pipe 112.

After cooling the high temperature gas, the high temperature gas is discharged via the outlet pipe 112. The outlet pipe 112 is connected with an outer waste gas purification apparatus.

The dehydrating device 12 is disposed on the air intake end of the cooling processing device 11 (the same as the terminal 1111 of the inlet pipe 111). Before cooling the high temperature gas by the cooling processing device 11, the high temperature gas in the cooling processing device 11 is dewatered.

The dehydrating device 12 may be a molecular sieve dehydrating device. When the temperature of the high temperature gas is in the range of the preset temperature, the molecular sieve dehydrating device is capable of absorbing moisture in the high temperature gas. When the temperature of the high temperature gas is greater than the range of the preset temperature, the molecular sieve dehydrating device is capable of gasifying and discharging the previously absorbed moisture due to the temperature of the high temperature gas. That is, the molecular sieve dehydrating device discharges moisture. Since the dehydrating device which can discharge the previously absorbed moisture is adopted, the dehydrating device would not require regular replacement. The preset temperature may be, for example, between 60 degrees Celsius and 80 degrees Celsius.

The dehydrating device 12 may be a dry box, which has desiccants therein. The dry box is used to absorb the moisture in the introduced high temperature gas. After the high temperature gas is dried, the high temperature gas is introduced into the cooling processing device 11. After the dry box absorbs a certain amount of moisture, the absorption capability is decreased. Therefore, in order to achieve a good dewatering effect, the dry box would require regular replacement.

The working process of the high temperature operating system is as follows: firstly, introducing the high temperature gas into the gas cooling equipment 1 from the high temperature processing equipment 2; dewatering the high temperature gas via the dehydrating device 12; introducing the dewatered high temperature gas into the closed container 113 by passing it through the inlet pipe 111; cooling the dewatered high temperature gas via the refrigerants in the closed container 113 of the refrigerant storage device 10; finally, discharging the cooled high temperature gas by passing it through the outlet pipe 112.

The present invention provides the high temperature operating system which can dewater the high temperature gas by adding the dehydrating device to the gas cooling equipment, thereby solving problems arising from the pressure increasing and the quartz cassettes breaking easily due to moisture in the low temperature portion of the high temperature gas discharged from a high temperature oven entering the cooling processing device, thereby improving manufacturing efficiency and reducing the manufacturing cost.

The above descriptions are merely preferable embodiments of the present invention, but are not intended to limit the scope of the present invention. Any modification or replacement made by those skilled in the art without departing from the spirit and principle of the present invention should fall within the protection scope of the present invention. Therefore, the protection scope of the present invention is subject to the appended claims.

What is claimed is:

1. A gas cooling equipment, comprising:
   a refrigerant storage device comprising refrigerants, wherein the refrigerants have a temperature between −40 degrees Celsius and −30 degrees Celsius therein;
   a cooling processing device for cooling a high temperature gas via the refrigerants, wherein the cooling processing device comprises an air intake end, an air outtake end, an inlet pipe, an outlet pipe, and a closed container; and
   a dehydrating device disposed on the air intake end of the cooling processing device for dewatering the high temperature gas, wherein the dehydrating device is a molecular sieve dehydrating device for dewatering the high temperature gas having a range between 60 degrees Celsius and 80 degrees Celsius;
   wherein the closed container is partially disposed in the refrigerant storage device;
   a first terminal of the inlet pipe extends to an outside of the closed container, and a second terminal of the inlet pipe extends to an inside of the closed container and is encompassed inside the refrigerant storage device;
   a first terminal of the outlet pipe extends to the inside of the closed container and is placed external to the refrigerant storage device, and a second terminal of the outlet pipe extends to the outside of the closed container;
   a distance between the second terminal of the inlet pipe and a bottom of the closed container is less than a distance between the first terminal of the outlet pipe and the bottom of the closed container;
   a distance between the second terminal of the inlet pipe and a top of the closed container is greater than a distance between the first terminal of the outlet pipe and the top of the closed container; and
   wherein when the gas cooling equipment is in operation, the gas cooling equipment is configured such that an outlet gas flow direction of the gas through the second terminal of the inlet pipe is opposite to an intake gas flow direction of the gas through the first terminal of the outlet pipe.

2. The gas cooling equipment according to claim 1, wherein the molecular sieve dehydrating device is configured to discharge moisture in response to a temperature of the high temperature gas being greater than the range between 60 degrees Celsius and 80 degrees Celsius.

3. A gas cooling equipment, comprising:
   a refrigerant storage device comprising refrigerants, wherein the refrigerants have a preset temperature therein;
   a cooling processing device for cooling a high temperature gas via the refrigerants, wherein the cooling processing device comprises an air intake end, an air outtake end, an inlet pipe, an outlet pipe, and a closed container; and
   a dehydrating device disposed on the air intake end of the cooling processing device for dewatering the high temperature gas, wherein the closed container is partially disposed in the refrigerant storage device;
   a first terminal of the inlet pipe extends to an outside of the closed container, and a second terminal of the inlet pipe extends to an inside of the closed container and is encompassed inside the refrigerant storage device;
   a first terminal of the outlet pipe extends to the inside of the closed container and is placed external to the refrigerant storage device, and a second terminal of the outlet pipe extends to the outside of the closed container;
   a distance between the second terminal of the inlet pipe and a bottom of the closed container is less than a distance between the first terminal of the outlet pipe and the bottom of the closed container;
   a distance between the second terminal of the inlet pipe and a top of the closed container is greater than a distance between the first terminal of the outlet pipe and the top of the closed container; and
   wherein when the gas cooling equipment is in operation, the gas cooling equipment is configured such that an outlet gas flow direction of the gas through the second terminal of the inlet pipe is opposite to an intake gas flow direction of the gas through the first terminal of the outlet pipe.

4. The gas cooling equipment according to claim 3, wherein the dehydrating device is a molecular sieve dehydrating device for dewatering the high temperature gas in a predetermined temperature range.

5. The gas cooling equipment according to claim 4, wherein the molecular sieve dehydrating device is configured to discharge moisture in response to a temperature of the high temperature gas being greater than the predetermined temperature range.

6. The gas cooling equipment according to claim 4, wherein the predetermined temperature range is between 60 degrees Celsius and 80 degrees Celsius, and the preset temperature is between −40 degrees Celsius and −30 degrees Celsius.

7. The gas cooling equipment according to claim 3, wherein the dehydrating device is a dry box.

8. A high temperature operating system, comprising:
a high temperature processing equipment for treating an operate-needed item in a high temperature and producing a high temperature gas, wherein the high temperature gas is discharged via a high temperature gas output terminal;
a gas cooling equipment connected with the high temperature gas output terminal of the high temperature processing equipment, the gas cooling equipment comprising:
a refrigerant storage device comprising refrigerants, wherein the refrigerants have a preset temperature therein;
a cooling processing device for cooling the high temperature gas via the refrigerants, wherein the cooling processing device comprises an air intake end, an air outtake end, an inlet pipe, an outlet pipe, and a closed container; and
a dehydrating device disposed on the air intake end of the cooling processing device for dewatering the high temperature gas, wherein the closed container is partially disposed in the refrigerant storage device;
a first terminal of the inlet pipe extends to an outside of the closed container, and a second terminal of the inlet pipe extends to an inside of the closed container and is encompassed inside the refrigerant storage device;
a first terminal of the outlet pipe extends to the inside of the closed container and is placed external to the refrigerant storage device, and a second terminal of the outlet pipe extends to the outside of the closed container;
a distance between the second terminal of the inlet pipe and a bottom of the closed container is less than a distance between the first terminal of the outlet pipe and the bottom of the closed container;
a distance between the second terminal of the inlet pipe and a top of the closed container is greater than a distance between the first terminal of the outlet pipe and the top of the closed container; and
wherein when the gas cooling equipment is in operation, the gas cooling equipment is configured such that an outlet gas flow direction of the gas through the second terminal of the inlet pipe is opposite to an intake gas flow direction of the gas through the first terminal of the outlet pipe.

9. The high temperature operating system according to claim 8, wherein the dehydrating device is a molecular sieve dehydrating device for dewatering the high temperature gas in a predetermined temperature range.

10. The high temperature operating system according to claim 9, wherein the molecular sieve dehydrating device is configured to discharge moisture in response to a temperature of the high temperature gas being greater than the predetermined temperature range.

11. The high temperature operating system according to claim 8, wherein the dehydrating device is a dry box.

* * * * *